United States Patent
Son et al.

(10) Patent No.: US 7,757,008 B2
(45) Date of Patent: Jul. 13, 2010

(54) MODULE-BASED OPERATING APPARATUS AND METHOD FOR PORTABLE DEVICE

(75) Inventors: Jung Soo Son, Suwon-si (KR); Sung Cheol Kim, Goyang-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 141 days.

(21) Appl. No.: 12/042,887

(22) Filed: Mar. 5, 2008

(65) Prior Publication Data

US 2009/0144459 A1 Jun. 4, 2009

(30) Foreign Application Priority Data

Dec. 3, 2007 (KR) ...................... 10-2007-0124583

(51) Int. Cl.
*G06F 3/00* (2006.01)
(52) U.S. Cl. .................... 710/2; 710/8; 710/11; 710/14; 710/15; 710/38
(58) Field of Classification Search ........................ None
See application file for complete search history.

(56) References Cited

U.S. PATENT DOCUMENTS

2005/0013104 A1    1/2005  Feague et al.
2006/0015368 A1*   1/2006  Hockey ........................... 705/2
2006/0068760 A1*   3/2006  Hameed et al. ........... 455/412.1
2007/0162634 A1*   7/2007  Okazaki ....................... 710/15
2007/0256029 A1*  11/2007  Maxwell ..................... 715/834
2009/0038145 A1*   2/2009  Kozu et al. ................. 29/623.2

FOREIGN PATENT DOCUMENTS

| JP | 2001-312250 | 11/2001 |
| JP | 2003-337322 | 11/2003 |
| JP | 2005-221723 | 8/2005 |
| JP | 2006-172230 | 6/2006 |
| KP | 1999-0077436 | 10/1999 |

OTHER PUBLICATIONS

Chien, Liang-Chy, Bistable Reflective Displays for Paper-Like Displays, Oct. 17, 2007, Optical Fiber Communication and Optoelectronics Conference 2007, Asia, pp. 1-3.*

* cited by examiner

*Primary Examiner*—Eron J Sorrell
(74) *Attorney, Agent, or Firm*—NSIP Law

(57) ABSTRACT

A module-based operating apparatus and method for a portable device is provided. A module-based operating apparatus and method for a portable device, in which various types of personal service contents such as a diary function, a wallet function, and a portable computing function are made into functional modules so as to install and/or detach the functional modules to/from a common bus-based slot.

13 Claims, 5 Drawing Sheets

MODULE-BASED OPERATING APPARATUS AND METHOD FOR PORTABLE DEVICE

CROSS-REFERENCE TO RELATED APPLICATION

This application claims the benefit under 35 U.S.C. §119(a) of a Korean Patent Application No. 10-2007-0124583, filed on Dec. 3, 2007, in the Korean Intellectual Property Office, the entire disclosure of which is incorporated herein by reference.

TECHNICAL FIELD

Methods and apparatuses consistent with the following description relate to a digital portable device, and more particularly, to a module-based operating apparatus and method for a digital portable device.

BACKGROUND

Generally, digital device users carry a mobile phone at all times when commuting while in a mobile environment. Also, the digital device users use a diary, a personal digital assistant (PDA), a computer, and the like in order to manage various types of schedules. When attending a meeting, the digital device users generally carry a diary and a notebook computer. Also, the digital device users carry multiple credit cards in their wallet.

However, when carrying various types of devices, it may be very inconvenient to carry many devices at one time and also it may be very difficult to be aware of operational procedures of the devices.

Currently, boundary breakdown between communication devices and computing devices accelerates a convergence phenomenon in portable terminals and also brings technical developments that include various types of contents in a single terminal using unification of technologies for portable terminal components. However, since a product model is generally manufactured based on a one-sided point of view from terminal manufactures, advancements in the field of portable terminals using an all-in-one scheme may not satisfy various types of demands from consumers. Also, general users desire simplicity and slimness of a digital device in order to improve the portability of the digital device. However, as more functions are included in software or the digital device, the general users need to be aware of even a function that the general users may not need to know about in reality. Therefore, it is inconvenient for the general users to use the digital device in their daily lives. Also, the general users have no choice but to purchase a portable terminal embedded with unsatisfactory and unnecessary contents for their own personal preference. In this case, the users may have a potential cost burden.

SUMMARY

In one general aspect, there is provided a module-based operating apparatus and method for a portable device in which functions desired by a user are included in a single device based on a user preference.

In another aspect, there is provided a module-based operating apparatus and method for a portable device in which various types of functions are provided and the apparatus/portable device is readily carried and used.

According to still another aspect, there is provided a module-based operation apparatus for a portable device that is applied to a detachable ultra slim functional module and an ultra slim main processing module enabling installation of the functional module, the apparatus including a common bus unit which includes a structure enabling installation of the functional module, a first interface unit which is connected with the functional module via the common bus unit and performs wired transmission and reception of data, a first wireless transceiver which wirelessly transmits and receives data to/from the functional module, a first touch screen unit which displays a user interface screen and receives a user input signal corresponding to the user interface screen, and a first control unit which activates either the first interface unit or the first wireless transceiver depending on whether the functional module is connected with the common bus unit, and receives the user input signal from the first touch screen unit, and processes the received user input signal.

According to yet another aspect, there is provided a module-based operating method for a portable device that is applied to a detachable ultra slim functional module and an ultra slim main processing module enabling installation of the functional module, the method including determining whether the functional module is installed, setting a wired communication mode with the functional module according to the installation of the functional module, and receiving data from the functional module and processing the data, using a touch screen interface.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION OF EXEMPLARY EMBODIMENTS

The following detailed description is provided to assist the reader in gaining a comprehensive understanding of the methods and systems described herein. Accordingly, various changes, modifications, and equivalents of the systems and methods described herein will be suggested to those of ordinary skill in the art. Also, descriptions of well-known functions and constructions are omitted to increase clarity and conciseness.

Figure 1:
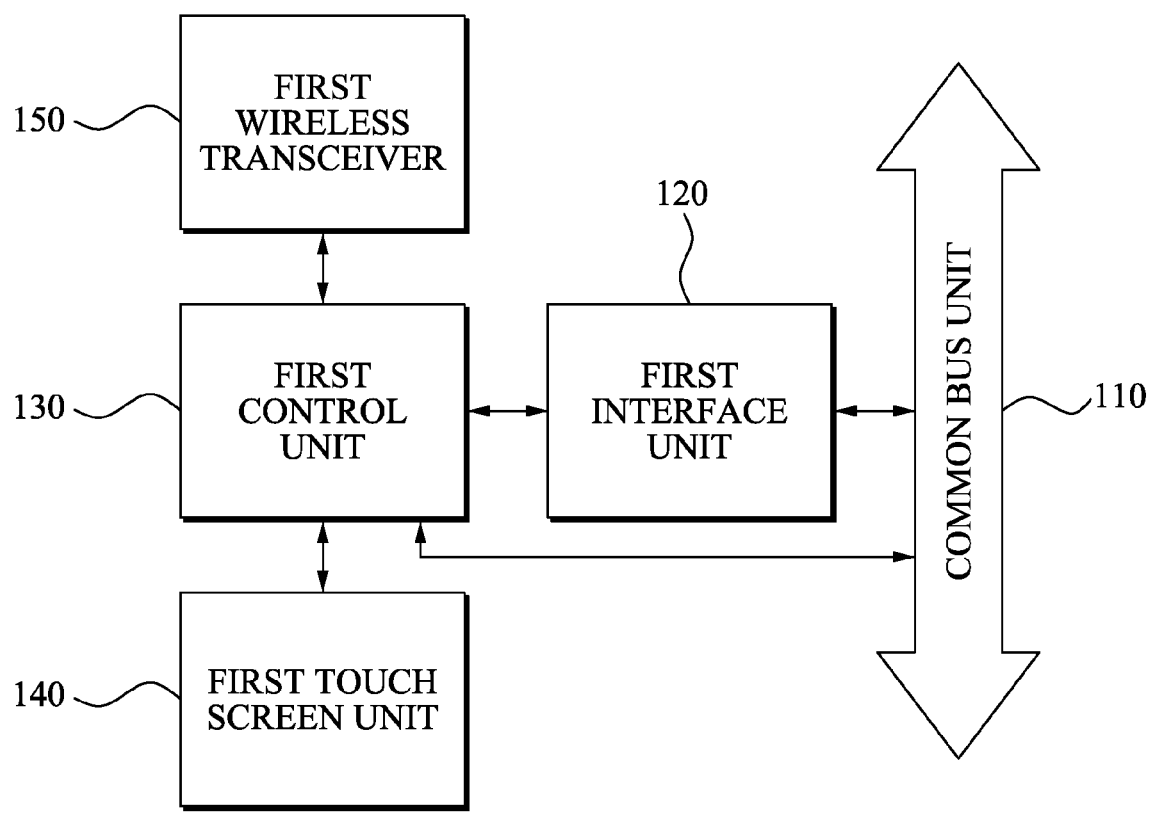
FIG. 1 is a block diagram illustrating a module-based operating apparatus for a portable device according to an exemplary embodiment.

FIG. 1 is a block diagram illustrating a module-based operating apparatus for a portable device according to an exemplary embodiment.

Referring to FIG. 1, the module-based operating apparatus for the portable device includes a common bus unit 110, a first interface unit 120, a first control unit 130, a first touch screen unit 140, and a first wireless transceiver 150.

The common bus unit 110 includes a structure enabling installation of a functional module. When the functional module is installed, the common bus unit 110 functions to transfer data from the function module to the first interface unit 120, and transfer data from the first interface unit 120 to the functional module. The common bus unit 110 may be in a connectivity deck structure of a folder-rotary type. However, it is only exemplary and is not limited thereto. Also, the common bus unit 110 may detect the installation of the functional module. In this case, the common bus unit 110 may generate an installation signal to inform that the functional module is installed in the common bus unit 110 and output the generated installation signal to the first control unit 130.

The first interface unit 120 functions to receive data of the functional module from the common bus unit 110 and transfer the received data of the functional module to the first control unit 130. Also, the first interface unit 120 functions to receive data from the first control unit 130 and transfer the received data of the first control unit 130 to the common bus unit 110.

The first control unit 130 functions to receive the installation signal from the common bus unit 110 and determine whether the functional module is connected with the common bus unit 110 according to the installation signal. When the functional module is installed in and thereby is connected with the common bus unit 110, the control unit 130 activates the first interface unit 120. Conversely, when the functional module is separated from the common bus unit 110, the control unit 130 activates the first wireless transceiver 150, receives a user input signal from the first touch screen unit 140, and processes the user input signal. The first control unit 130 may receive a wired/wireless mode selection signal from the first touch screen unit 140 and activate either the first interface unit 120 or the first wireless transceiver 150 according to a selection of the wired/wireless mode selection signal. However, it is not limited thereto. Also, the first control unit 130 may simultaneously activate the first interface unit 120 and the first wireless transceiver 150 according to the selection of the wired/wireless mode selection signal. However, it is not limited thereto.

The first touch screen unit 140 functions to display a user interface screen, receive a user input signal corresponding to the user interface screen, and output the received user input signal to the first control unit 130. According to an aspect, the first touch screen unit 140 may display a wired/wireless mode selection user interface screen, receive a wired/wireless mode selection signal according to the wired/wireless mode selection user interface screen, and output the received wired/wireless mode selection signal to the first control unit 130. The first touch screen unit 140 may include a paper-like display (PLD) that includes a display function and a handwriting recognition function. However, it is not limited thereto.

When the functional module is separated from the common bus unit 110, the first wireless transceiver 150 functions to receive data from the functional module using a wireless scheme and output the received data to the first control unit 130. Also, the first wireless transceiver 150 functions to receive data from the first control unit 130 and transmit the received data using the wireless scheme.

Figure 2:
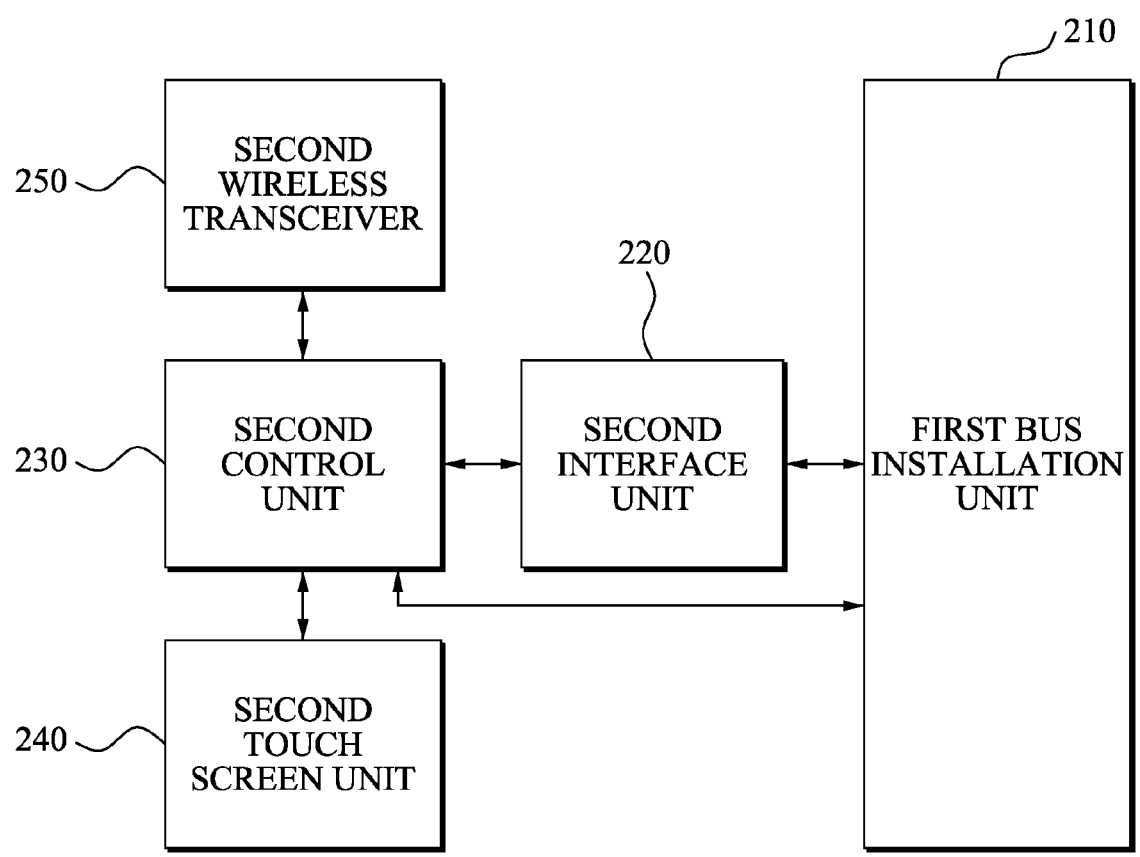
FIG. 2 is a block diagram illustrating a functional module of a module-based operating apparatus for a portable device according to an exemplary embodiment.

FIG. 2 is a block diagram illustrating a functional module of a module-based operating apparatus for a portable device according to an exemplary embodiment.

Referring to FIG. 2, the module-based operating apparatus includes a first bus installation unit 210, a second interface unit 220, a second control unit 230, a second touch screen unit 240, and a second wireless transceiver 250.

The first bus installation unit 210 includes a structure enabling installation in the common bus unit 110. When the first bus installation unit 210 is installed in the common bus unit 110, the first bus installation unit 210 functions to transfer data from the common bus unit 110 to the second interface unit 220, and transfer data from the second interface unit 220 to the common bus unit 110. In this instance, the first bus installation unit 210 may be in a pin structure enabling installation in a connectivity deck of a folder rotary type. However, it is not limited thereto. Also, the first bus installation unit 210 may detect that the first bus installation unit 210 is installed in the common bus unit 110, generate an installation signal to inform about the above event, and output the generated installation signal to the second control unit 230.

The second interface unit 220 functions to receive data of the common bus unit 110 from the first bus installation unit 210 and transfer the received data of the common bus unit 110 to the second control unit 230. Also, the second interface unit 220 functions to receive data of the second control unit 230 and transfer the received data of the second control unit 230 to the first bus installation unit 210.

The second control unit 230 functions to receive the installation signal from the first bus installation unit 210 and determine whether the first bus installation unit 210 is connected with the common bus unit 110, based on the installation signal. When the first bus installation unit 210 is installed in and thereby is connected with the common bus unit 110, the second control unit 230 may activate the second interface unit 220. Conversely, when the first bus installation unit 210 is separated from the common bus unit 110, the second control unit 230 may activate the second wireless transceiver 250, receive a user input signal from the second touch screen unit 240, and process the user input signal. In this instance, the second control unit 230 may receive a wired/wireless mode selection signal and activate either the second interface unit 220 or the second wireless transceiver 250 according to a selection of the wired/wireless mode selection signal. However, it is not limited thereto. Also, the second control unit 230 may simultaneously activate the second interface unit 220 and the second wireless transceiver 250 according to the selection of the wired/wireless mode selection signal.

The second touch screen unit 240 functions to display a user interface screen, receive a user input signal corresponding to the user interface screen, and output the user input signal to the second control unit 230. According to an aspect, the second touch screen unit 240 may display a wired/wireless mode selection user interface screen, receive a wired/wireless mode selection signal according to the wired/wireless mode selection user interface screen, and output the received wired/wireless mode selection signal to the second control unit 230. The second touch screen unit 240 may include a PLD that includes a display function and a handwriting recognition function. However, it is not limited thereto.

When the first bus installation unit 210 is separated from the common bus unit 110, the second wireless transceiver 250 functions to receive data from the first wireless transceiver 150 using a wireless scheme and output the received data to the second control unit 230. Also, the second wireless transceiver 250 functions to receive data from the second control unit 230 and transmit the received data using the wireless scheme. The second wireless transceiver 250 may be integrally formed with a pin structure enabling installation in a connectivity deck of a folder rotary type. However, it is not limited thereto.

Figure 3:
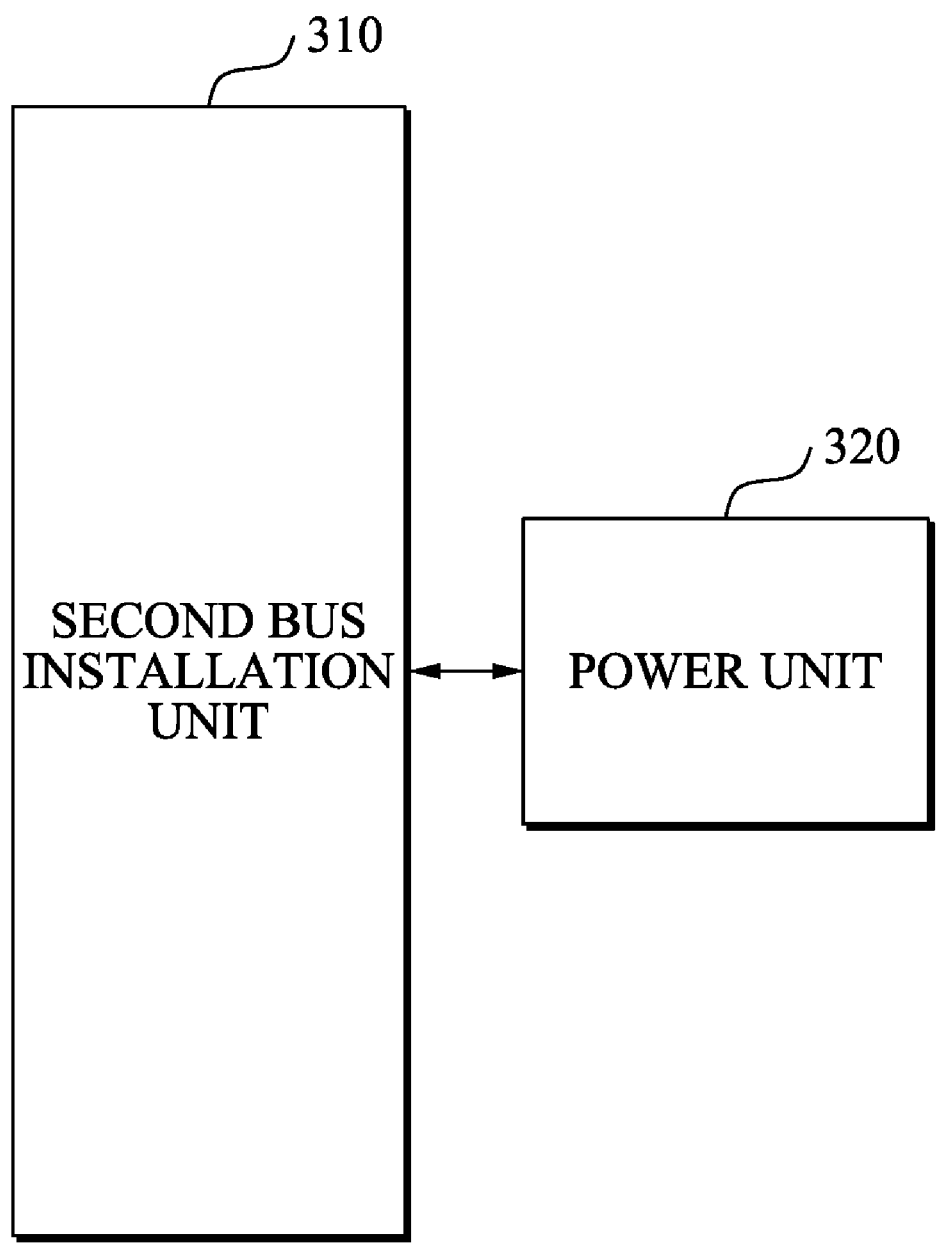
FIG. 3 is a block diagram illustrating a power module of a module-based operating apparatus for a portable device according to an exemplary embodiment.

FIG. 3 is a block diagram illustrating a power module of a module-based operating apparatus for a portable device according to an exemplary embodiment.

Referring to FIG. 3, the module-based operating apparatus includes a second bus installation unit 310 and a power unit 320.

The second bus installation unit 310 includes a structure enabling installation in the common bus unit 110. When the second bus installation unit 310 is installed in the common bus unit 110, the second bus installation unit 310 functions to transfer power of the power unit 320 using the common bus unit 110. The second bus installation unit 310 may be formed in a pin structure enabling installation in a connectivity deck of a folder rotary type.

The power unit 320 functions to generate power and supply the generated power using the second bus installation unit 310. The power unit 320 may include a flexible battery or a flat lithium ion battery. However, it is not limited thereto.

Figure 4:
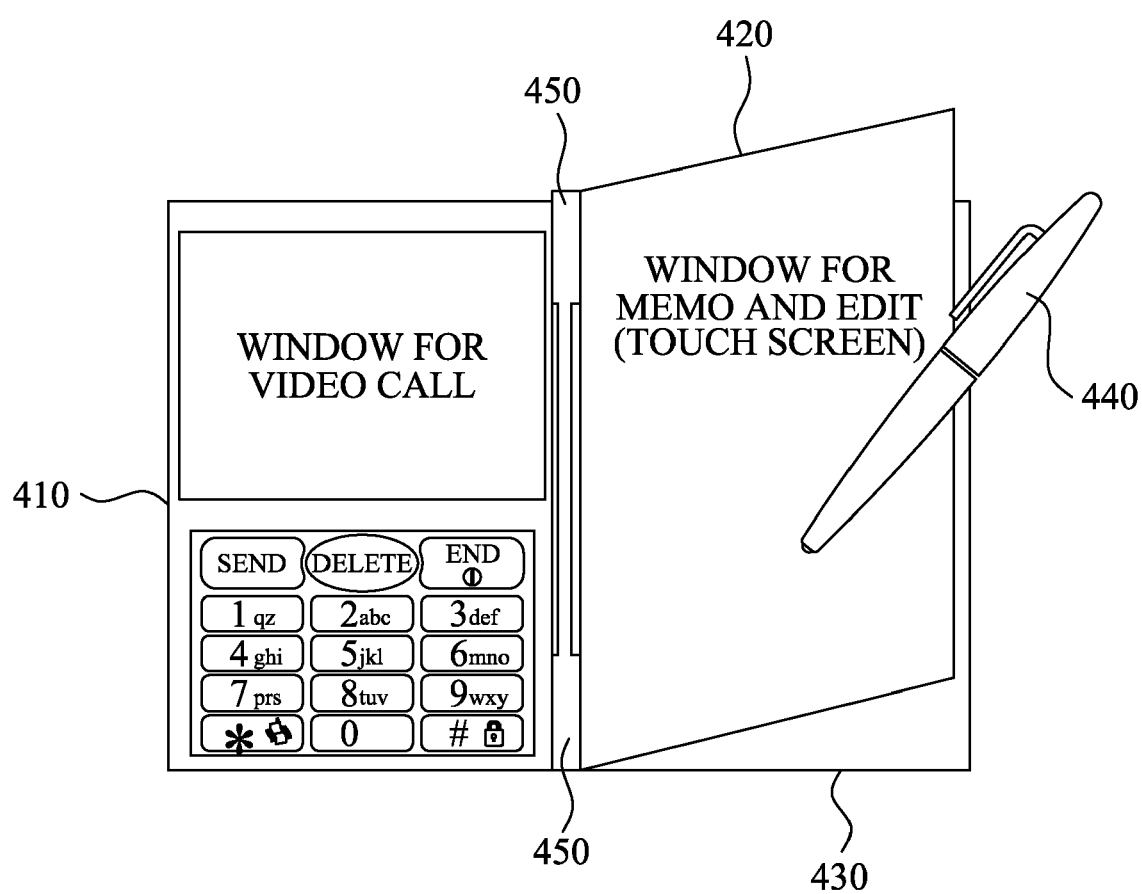
FIG. 4 illustrates an example of the module-based operating apparatus for the portable device according to FIGS. 1 through 3.

FIG. 4 illustrates an example of the module-based operating apparatus for the portable device according to FIGS. 1 through 3.

Hereinafter, an operation of the module-based operating apparatus will be described with reference to FIGS. 1 through 4.

When a user desires to make a call, the user selects a call mode using a user interface screen displayed on the first touch screen unit 140 of a main processing module 410. When the call mode is selected, a user interface view for making the call is displayed on the first touch screen unit 140 of the main processing module 410. The user interface view may include a button portion for input of a telephone number and an image portion for a video call. However, it is not limited thereto. The user may touch the button portion of the first touch screen unit 140 and thereby make a call. In order to make a call, the first wireless transceiver 150 of the main processing module 410 may support a cellular communication function.

When the user desires to have a meeting, the user may install in the main processing module 410 a functional module 420 that enables notes using an electronic pen 440. A deck structure that is used for installation may support a plug-and-play scheme. When the functional module 420 is installed in the main processing module 410, the common bus unit 110 may detect the installation of the functional module 420 and generate an installation signal to inform that the functional module 420 is installed in the common bus unit 110, and output the generated installation signal to the first control unit 130. The control unit 130 may receive the installation signal from the common bus unit 110, detect from the installation signal that the functional module 420 is installed in and thereby is connected with the common bus unit 110, and activate the first interface unit 120 to make a wired communication with the functional module 420. Also, the second interface unit 220 of the functional module 420 may be activated in a similar manner as above. When the user records notes of the meeting in the second touch screen unit 240 of the functional module 420, the notes may be input into the second control unit 230 and be processed by the second control unit 230. Data processed by the second control unit 230 may be transferred to the main processing module 410 via the second interface unit 220 and the first bus installation unit 210. The data processed by the second control unit 230 may be stored in a storage unit (not shown) of the main processing module 410 or a storage unit (not shown) of the functional module 420. Also, the first touch screen unit 140 of the main processing module 410 may interoperate with the second touch screen unit 240 of the functional module 420 to thereby display a single wide display screen.

When the user separates the functional module 420 and lets a counter party of the meeting use the functional module 420, the common bus unit 110 may detect the separation of the functional module 420 and activate the first wireless transceiver 150. The second wireless transceiver 250 of the functional module 420 may be activated in a similar manner as above. When the counter party records notes of the meeting in the second touch screen unit 240 of the functional module 420, the notes may be input in the second control unit 230 and be processed by the second control unit 230. The data processed by the second control unit 230 may be transferred to the first wireless transceiver 150 of the main processing unit 410. The data processed by the second control unit 230 may be stored in the storage unit of the main processing module 410 or the storage unit of the functional module 420.

The functional module 420 may provide a wallet function for a financial payment, a diary function for a schedule, a note, a memo, a messenger, and information searching, and a mobile computing function for working on documents and web browsing. However, it is not limited thereto. Also, the second touch screen unit 240 may display in a lower portion of the second touch screen unit 240 a user interface that supports a screen save and play mode. However, it is not limited thereto.

A power-supply functional module 430 may be installed in the common bus unit 110 of the main processing module 410 and supply power to the main processing module 410 and the functional module 420 via the second bus installation unit 310.

Figure 5:
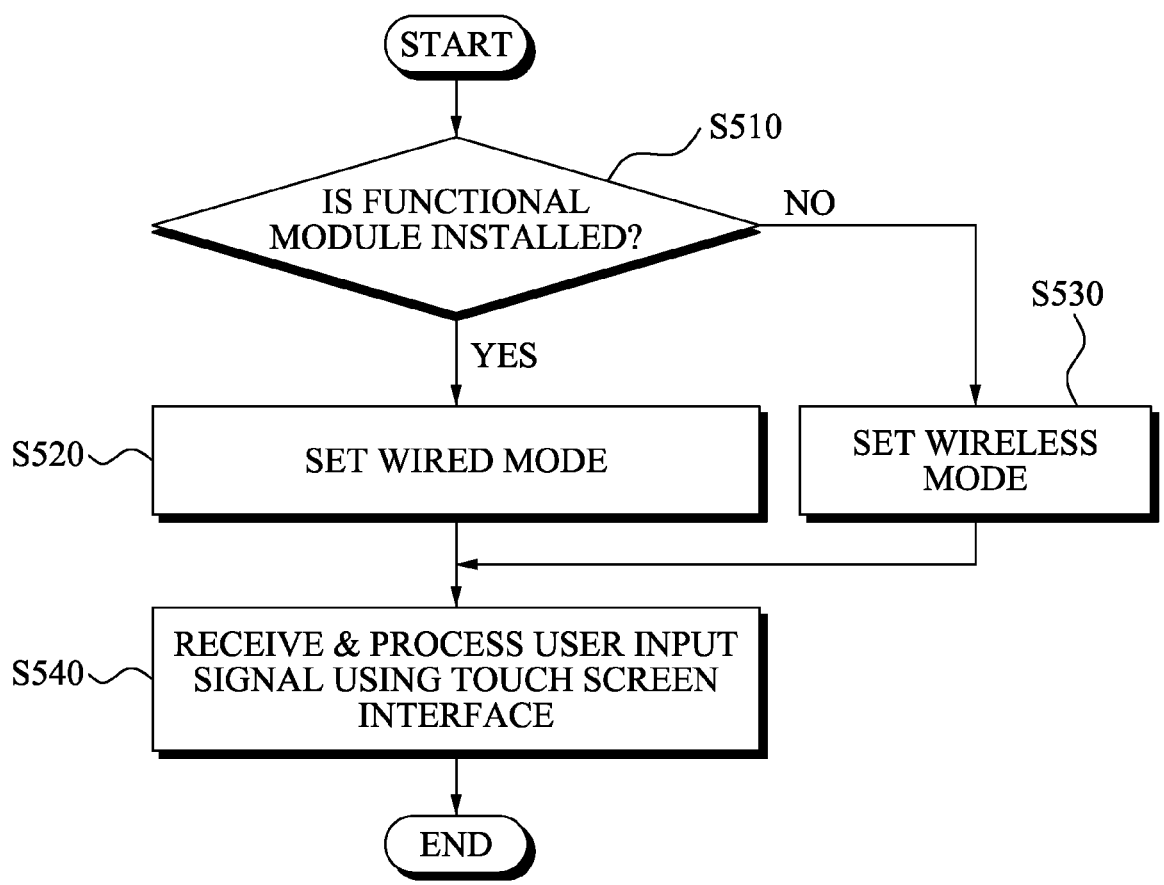
FIG. 5 is a flowchart illustrating a module-based operating method for a portable device according to an exemplary embodiment.

FIG. 5 is a flowchart illustrating a module-based operating method for a portable device according to an exemplary embodiment.

A single operating state of the main processing module 410 is maintained until the functional module 420 is installed in the main processing module 410. A user may select the functional module 420 to be installed in the main processing module 410 according to a user preference.

In operation S510, the first control unit 130 of the main processing module 410 receives an installation signal from the common bus unit 110 and determines whether the functional module 420 is installed in the common bus unit 110, based on the installation signal.

In operation S520, when the functional module 420 is installed in and thereby is connected with the common bus unit 110, the first control unit 130 activates the first interface unit 120 and sets a wired mode. Conversely, when the functional module 420 is separated from the common bus unit 110, the first control unit 130 activates the first wireless transceiver 150 and sets a wireless mode in operation S530.

In operation S540, the first control unit 130 receives from the functional module 420 a user input signal via the common bus unit 110 or the first wireless transceiver 150 and processes the user input signal, using a touch screen interface.

The main processing module 410 may provide a user interface screen that is compatible with the functional module 420 selected by the user. The user may perform a desired operation using the provided user interface screen.

The methods described above including the module-based operating method for a portable device may be recorded, stored, or fixed in one or more computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A module-based operating apparatus for a portable device, the apparatus comprising:
    a common bus unit which includes a structure enabling installation of a detachable ultra slim functional module;
    a first interface unit for connecting with the detachable ultra slim functional module via the common bus unit and performs wired transmission and reception of data;
    a first wireless transceiver for wirelessly transmitting and receiving data to/from the detachable ultra slim functional module;
    a first touch screen unit which displays a user interface screen and receives a user input signal corresponding to the user interface screen;
    a detachable ultra slim functional module that comprises a first bus installation unit which includes a structure enabling installation in the common bus unit and a second wireless transceiver for wirelessly transmitting and receiving data to and from the first wireless transceiver, and a second touch screen unit which displays a user interface screen and receives a user input signal corresponding to the user interface screen; and
    a first control unit for activating either the first interface unit or the first wireless transceiver depending on whether the detachable ultra slim functional module is connected with the common bus unit.

2. The apparatus of claim 1,
    wherein the first control unit receives the user input signal from the first touch screen unit and processes the received user input signal.

3. The apparatus of claim 2, wherein the first touch screen unit displays a wired/wireless mode selection user interface screen and receives a wired/wireless mode selection signal according to the wired/wireless mode selection user interface screen, and the first control unit activates either the first interface unit or the first wireless transceiver according to the wired/wireless mode selection signal.

4. The apparatus of claim 2, wherein the first touch screen unit includes a paper-like display (PLD) to display a screen.

5. The apparatus of claim 1, wherein the detachable ultra slim functional module further comprises:
    a second interface unit which is connected with the first bus installation unit and transmits and receives data to/from the first bus installation unit;
    a second control unit which activates either the second interface unit or the second wireless transceiver depending on whether the first bus installation unit is connected with the common bus unit, receives the user input signal from the second touch screen unit, and processes the received user input signal.

6. The apparatus of claim 4, wherein the detachable ultra slim functional module further comprises:
    a second interface unit which is connected with the first bus installation unit and transmits and receives data to/from the first bus installation unit;
    a second control unit which activates either the second interface unit or the second wireless transceiver depending on whether the first bus installation unit is connected with the common bus unit, receives the user input signal from the second touch screen unit, and processes the received user input signal.

7. The apparatus of claim 5, wherein the second touch screen unit displays a wired/wireless mode selection user interface screen and receives a wired/wireless mode selection signal according to the wired/wireless mode selection user interface screen, and the second control unit activates either the second interface unit or the second wireless transceiver according to the wired/wireless mode selection signal.

8. The apparatus of claim 7, wherein the second touch screen unit includes a PLD to display a screen.

9. The apparatus of claim 1, further comprising:
    a second bus installation unit which includes a structure enabling installation in the common bus unit; and
    a power unit which generates power and supplies the generated power via the second bus installation unit,
    wherein the power unit includes a flexible battery.

10. The apparatus of claim 1, further comprising:
    a second bus installation unit which includes a structure enabling installation in the common bus unit; and
    a power unit which generates power and supplies the generated power via the second bus installation unit,
    wherein the power unit includes a flat lithium ion battery.

11. The apparatus of claim 1, wherein the common bus unit includes a connectivity deck that has a rotary structure in a folder type to enable installation of a plurality of detachable ultra slim functional modules.

12. A module-based operating method for a portable device that is applied to a detachable ultra slim functional module and an ultra slim main processing module enabling installation of the functional module, the method comprising:
    determining whether the functional module is installed;
    setting a wired communication mode with the functional module according to the installation of the functional module; and
    receiving data from the functional module and processing the data, using a touch screen interface,
    wherein the ultra slim main processing module comprises a common bus unit which includes a structure enabling installation of the detachable ultra slim functional module, a first interface unit which is connected with the functional module via the common bus unit and which performs wired transmission and reception of data, a first touch screen unit which displays a user interface screen and receives a user input signal corresponding to the user interface screen, and a first wireless transceiver which wirelessly transmits and receives data to and from the functional module, and
    wherein the detachable ultra slim functional module comprises a first bus installation unit which includes a structure enabling installation in the common bus unit, a second wireless transceiver which transmits and receives data to and from the first wireless transceiver, and a second touch screen unit which displays a user interface screen and receives a user input signal corresponding to the user interface screen.

13. The method of claim 12, further comprising:
    setting a wireless communication mode with the functional module when the functional module is separated.

* * * * *